US009961269B2

(12) United States Patent
Uchida

(10) Patent No.: US 9,961,269 B2
(45) Date of Patent: May 1, 2018

(54) IMAGING DEVICE, IMAGING DEVICE BODY, AND LENS BARREL THAT CAN PREVENT AN IMAGE DIAPHRAGM VALUE FROM FREQUENTLY CHANGING

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/406,759

(22) Filed: Jan. 15, 2017

(65) Prior Publication Data

US 2017/0126948 A1 May 4, 2017

Related U.S. Application Data

(63) Continuation of application No. PCT/JP2015/074043, filed on Aug. 26, 2015.

(30) Foreign Application Priority Data

Aug. 29, 2014 (JP) .................................. 2014-175535

(51) Int. Cl.
*H04N 5/235* (2006.01)
*H04N 5/353* (2011.01)
(Continued)

(52) U.S. Cl.
CPC ......... *H04N 5/2351* (2013.01); *H04N 5/2254* (2013.01); *H04N 5/2353* (2013.01); *H04N 5/3532* (2013.01); *H04N 5/374* (2013.01)

(58) Field of Classification Search
CPC .. H04N 5/2351; H04N 5/2353; H04N 5/3532; H04N 5/2254; H04N 5/374
See application file for complete search history.

(56) References Cited

U.S. PATENT DOCUMENTS 7,099,555 B2    8/2006  Onuki et al.
7,783,189 B2 *  8/2010  Kubota .................. H04N 5/232
                                                    348/362

(Continued)

FOREIGN PATENT DOCUMENTS

JP    H10-268382    10/1998
JP    2005-062733    3/2005
(Continued)

OTHER PUBLICATIONS

"Written Opinion of the International Searching Authority of PCT/JP2015/074043", dated Dec. 1, 2015, with English translation thereof, pp. 1-7.

*Primary Examiner* — Luong T Nguyen
(74) *Attorney, Agent, or Firm* — JCIPRNET

(57) ABSTRACT

An imaging device includes an APD filter. A first program diagram is selected in a case in which the APD filter is not disposed, and a second program diagram is selected in a case in which the APD filter is disposed. A set of an imaging diaphragm value AV and an imaging shutter speed TV is determined on the basis of an exposure value obtained from a photometric value obtained from a photometric unit. The first program diagram is a multiple-stage diaphragm type program diagram. In the first program diagram, diaphragm values AV take discrete values at an interval of a first value. In the second program diagram, a part of corrected diaphragm values, which are obtained by correcting diaphragm values of the first program diagram on the basis of optical characteristics of the APD filter, are thinned out so that each interval has at least a second value.

10 Claims, 17 Drawing Sheets

(51) Int. Cl.
*H04N 5/225* (2006.01)
*H04N 5/374* (2011.01)

(56) References Cited

U.S. PATENT DOCUMENTS

| | | | | |
|---|---|---|---|---|
| 8,310,589 B2 * | 11/2012 | Okamoto | ........... | H04N 5/23212 |
| | | | | 348/362 |
| 8,860,864 B2 * | 10/2014 | Shiohara | .............. | H04N 5/2353 |
| | | | | 348/222.1 |
| 9,325,912 B2 * | 4/2016 | Hirasawa | ................ | H04N 5/238 |
| 2007/0212055 A1 | 9/2007 | Yoshida | | |
| 2012/0162382 A1 * | 6/2012 | Hirasawa | ............... | G03B 7/095 |
| | | | | 348/47 |

FOREIGN PATENT DOCUMENTS

| JP | 2005062733 | 3/2005 |
|---|---|---|
| JP | 2005-266096 | 9/2005 |
| JP | 2007274669 | 10/2007 |

\* cited by examiner

IMAGING DEVICE, IMAGING DEVICE BODY, AND LENS BARREL THAT CAN PREVENT AN IMAGE DIAPHRAGM VALUE FROM FREQUENTLY CHANGING

CROSS-REFERENCE TO RELATED APPLICATION

This application is a Continuation of PCT International Application PCT/JP2015/074043 filed on 26 Aug. 2015, which claims priority under 35 USC 119(a) from Japanese Patent Application No. 2014-175535 filed on 29 Aug. 2014. The above application is hereby expressly incorporated by reference, in its entirety, into the present application.

BACKGROUND OF THE INVENTION

1. Field of the Invention

The present invention relates to an imaging device, an imaging device body, and a lens barrel that include an apodization filter.

2. Description of the Related Art

There is known an imaging device that includes an apodization filter (hereinafter, referred to as an APD filter) having optical characteristics in which light transmittance is reduced as a distance from an optical axis is increased (see JP2005-062733A corresponding to U.S. Pat. No. 7,099,555). The APD filter reduces the amount of light around only a blurred image (spotlight blurring or the like), which is out of focus, without reducing the amount of light around an image plane. Accordingly, the APD filter realizes a beautiful blur by applying gradation to the profile of a blurred image.

Since the APD filter has the above-mentioned optical characteristics, a light-reducing effect becomes great as the diaphragm value (F number) approaches an open value. For this reason, in JP2005-062733A, a substantial diaphragm value (T number), which is obtained by correcting an diaphragm value on the basis of the optical characteristics of the APD filter, is obtained and the determination of an imaging exposure (an imaging diaphragm value and an imaging shutter speed) is performed on the basis of the T number. In JP2005-062733A, a linear diaphragm type program diagram in which a diaphragm value continuously changes is used as a program diagram that is used for the determination of an imaging exposure.

A multiple-stage diaphragm type program diagram in which diaphragm values take discrete values is known as a program diagram other than the linear diaphragm type program diagram (see JP2007-274669A corresponding to U.S. Pat. Pub. No. 2007/212,055). The multiple-stage diaphragm type program diagram is used to mainly prevent an imaging diaphragm value from frequently changing due to a change in the brightness of a subject during a live view or video imaging.

Even in the imaging device disclosed in JP2005-062733A, it is considered that the determination of an imaging exposure is performed by using a multiple-stage diaphragm type program. diagram during a live view or video imaging. However, the correction of a diaphragm value based on the optical characteristics of the APD filter is performed as described above in JP2005-062733A. Accordingly, in the multiple-stage diaphragm type program diagram where diaphragm correction is reflected, an interval of diaphragm values is reduced as an diaphragm value approaches an open value.

Therefore, in a case in which a multiple-stage diaphragm type program diagram is used in an imaging device including an APD filter, an imaging diaphragm value frequently changes in accordance with a change in the brightness of a subject as an imaging diaphragm value approaches an open value. For this reason, unnatural flicker is generated.

SUMMARY OF THE INVENTION

An object of the invention is to provide an imaging device, an imaging device body, and a lens barrel that can prevent an imaging diaphragm value from frequently changing in accordance with a change in the brightness of a subject.

An imaging device of the invention comprises an imaging element, an diaphragm, a photometric unit, an apodization filter, a program diagram storage unit, an imaging exposure determining unit, and an imaging exposure setting unit. The imaging element photoelectrically converts an incident ray and outputs an imaging signal. The diaphragm adjusts the amount of the incident ray. The photometric unit performs photometry on the basis of the imaging signal. The apodization filter is disposed on a light path of the incident ray. The program diagram storage unit stores a first program diagram and a second program diagram. In the first program diagram, diaphragm values take discrete values at an interval of a first value. In the second program diagram, a part of corrected diaphragm values, which are obtained by correcting the diaphragm values of the first program diagram on the basis of optical characteristics of the apodization filter, are thinned out so that each interval has at least a second value. The imaging exposure determining unit determines a set of an imaging diaphragm value and an imaging shutter speed on the basis of an exposure value obtained from a photometric value obtained from the photometric unit. The imaging exposure determining unit selects the first program diagram in a case in which the apodization filter is not disposed, selects the second program diagram in a case in which the apodization filter is disposed. The imaging exposure setting unit sets an imaging exposure on the basis of the imaging diaphragm value and the imaging shutter speed determined by the imaging exposure determining unit.

It is preferable that "C<B<A" is satisfied in a case in which the first value is denoted by A, the second value is denoted by B, and a minimum interval taken by the corrected diaphragm value based on the optical characteristics is denoted by C. It is preferable that each interval of diaphragm values of the second program diagram is equal to or larger than the second value and is smaller than the first value.

A set of an imaging diaphragm value and an imaging shutter speed may correspond to one exposure value in the second program diagram, and the second program diagram may include a portion in which a plurality of sets of imaging diaphragm values and imaging shutter speeds correspond to one exposure value. In the latter case, it is preferable that the imaging exposure determining unit selects a set of an imaging diaphragm value and an imaging shutter speed where a variation in an imaging diaphragm value is minimum, in a case in which the imaging exposure determining unit is to determine a set of an imaging diaphragm value and an imaging shutter speed due to a change in the exposure value and a plurality of sets of imaging diaphragm values and imaging shutter speeds are present per exposure value.

The program diagram storage unit stores a third program diagram. In the third program diagram, corrected diaphragm values, which are obtained by correcting the diaphragm values of the first program diagram on the basis of optical characteristics, are not thinned out and take discrete values.

It is preferable that the imaging exposure determining unit selects the second program diagram in a video imaging mode and a live view mode and selects the third program diagram in a still image taking mode, in a case in which the apodization filter is disposed.

It is preferable that the imaging device further comprises a filter detecting unit. The filter detecting unit detects whether or not the apodization filter is disposed on the light path. It is preferable that the imaging exposure determining unit selects the first program diagram or the second program diagram on the basis of a detection result of the filter detecting unit.

It is preferable that the imaging element is a rolling shutter CMOS image sensor.

An imaging device body of the invention comprises a lens barrel mounting portion, an imaging element, a photometric unit, an imaging exposure determining unit, and an imaging exposure setting unit. A lens barrel including a diaphragm and an apodization filter is detachably mounted on the lens barrel mounting portion. The imaging element photoelectrically converts an incident ray entering from the lens barrel and outputs an imaging signal. The photometric unit performs photometry on the basis of the imaging signal. The program diagram storage unit stores a first program diagram and a second program diagram. In the first program diagram, diaphragm values take discrete values at an interval of a first value. In the second program diagram, a part of corrected diaphragm values, which are obtained by correcting the diaphragm values of the first program diagram on the basis of optical characteristics of the apodization filter, are thinned out so that each interval has at least a second value. The imaging exposure determining unit selects the first program diagram in a case in which the apodization filter is not disposed, selects the second program diagram in a case in which the apodization filter is disposed. The imaging exposure determining unit determines a set of an imaging diaphragm value and an imaging shutter speed on the basis of an exposure value obtained from a photometric value obtained from the photometric unit. The imaging exposure setting unit sets an imaging exposure on the basis of the imaging diaphragm value and the imaging shutter speed determined by the imaging exposure determining unit.

A lens barrel of the invention comprises an diaphragm, an apodization filter, a program diagram storage unit, and a base end portion. The diaphragm adjusts the amount of an incident ray. The apodization filter is disposed on a light path of the incident ray. The program diagram storage unit stores a second program diagram. In the second program diagram, a part of corrected diaphragm values, which are obtained by correcting diaphragm values of a first program diagram in which the diaphragm values take discrete values at an interval of a first value on the basis of optical characteristics of the apodization filter, are thinned out so that each interval has at least a second value. The base end portion is detachably mounted on an imaging device body. The imaging device body includes an imaging element, a photometric unit, an imaging exposure determining unit, and an imaging exposure setting unit. The imaging element photoelectrically converts an incident ray and outputs an imaging signal. The photometric unit performs photometry on the basis of the imaging signal. The imaging exposure determining unit receives the second program diagram and determines a set of an imaging diaphragm value and an imaging shutter speed on the basis of an exposure value obtained from a photometric value obtained from the photometric unit. The imaging exposure setting unit sets an imaging exposure on the basis of the imaging diaphragm value and the imaging shutter speed determined by the imaging exposure determining unit.

According to the invention, in a case in which the apodization filter is disposed on the light path of an incident ray, the determination of an imaging exposure and the setting of an imaging exposure is performed by using a second program diagram in which a part of corrected diaphragm values, which are obtained by correcting diaphragm values of a first program diagram in which the diaphragm values take discrete values at an interval of a first value on the basis of optical characteristics of an apodization filter, are thinned out so that each interval has at least a second value. Accordingly, it is possible to prevent an imaging diaphragm value from frequently changing in accordance with the brightness of a subject.

DESCRIPTION OF THE PREFERRED EMBODIMENTS

First Embodiment

Figure 1:
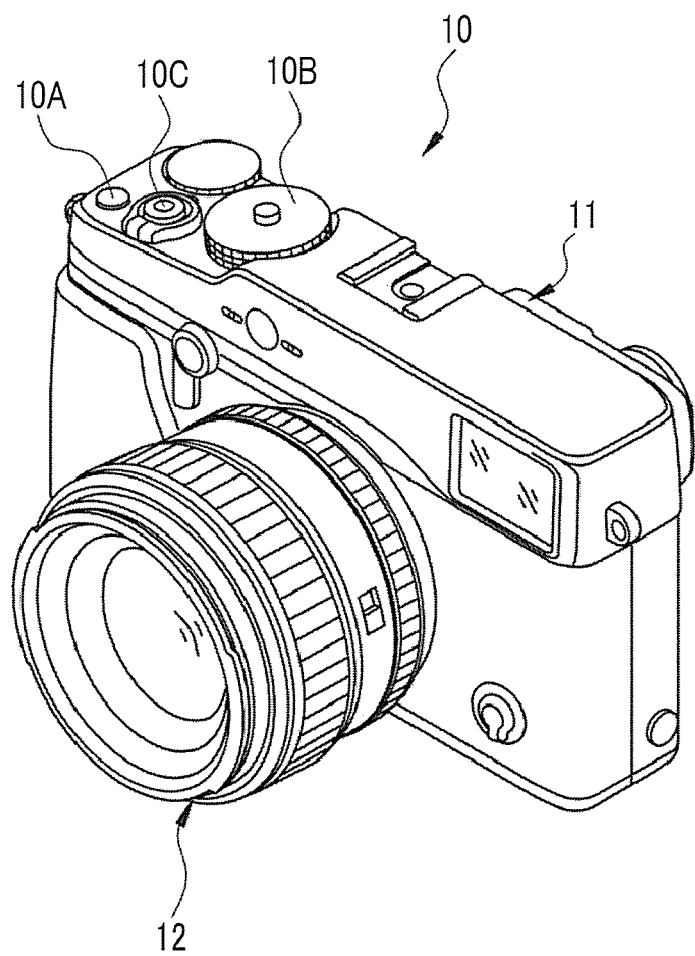
FIG. 1 is a perspective view of the appearance of an imaging device of a first embodiment.

An imaging device 10 of a first embodiment of the invention is a lens-interchangeable imaging device. In FIG. 1, the imaging device 10 includes an imaging device body 11 and a lens barrel 12. The imaging device body 11 is provided with a power button 10A, a mode switching button 10B, and a shutter button 10C. The power button 10A is operated to turn on/off a power supply. The mode switching button 10B is operated to switch an operation mode. This operation mode includes a live view mode, a video imaging mode, a still image taking mode, an image playback mode, and the like. The live view mode is a mode in which an image is merely displayed in real time without being recorded, and is performed before a video is taken or a still image is taken. The video imaging mode is a mode in which a video is taken, and the still image taking mode is a mode in which a still image is taken. The imaging of a video and the taking of a still image are performed by the press of the shutter button 10C during the live view mode.

Figure 2:
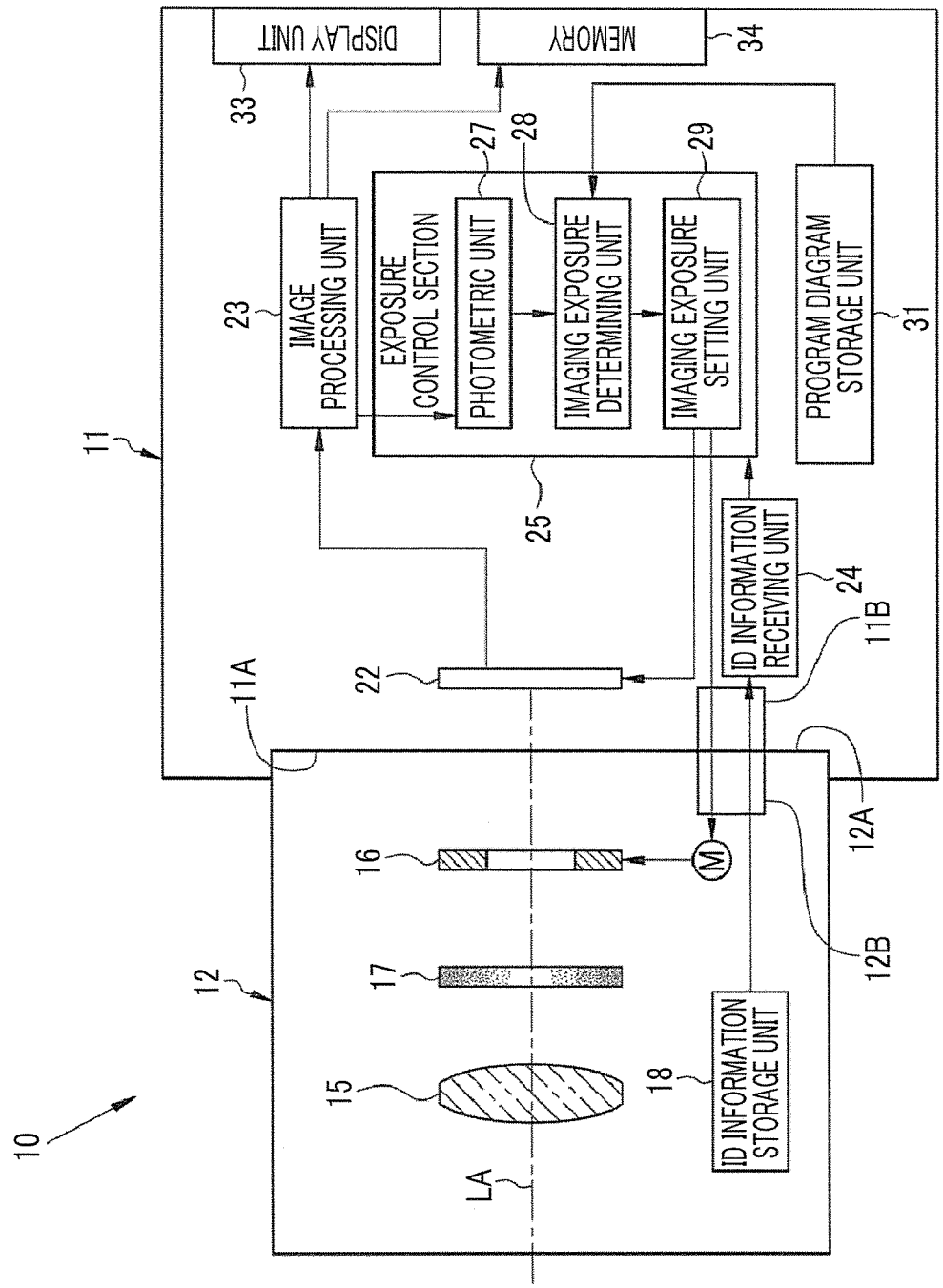
FIG. 2 is a block diagram showing the configuration of the imaging device of the first embodiment.

In FIG. 2, the imaging device body 11 is provided with a lens barrel mounting portion 11A. In the event that a base end portion 12A of the lens barrel 12 is mounted on the lens barrel mounting portion 11A, the imaging device body 11 and the lens barrel 12 are connected to each other. The lens barrel mounting portion 11A and the base end portion 12A are provided with electrical contacts 11B and 12B, respectively. The imaging device body 11 and the lens barrel 12 are electrically connected to each other through the electrical contacts 11B and 12B.

The lens barrel 12 is detachably mounted on the imaging device body 11. The lens barrel 12 includes a focus lens 15, a diaphragm 16, and an apodization (APD) filter 17. The focus lens 15, the APD filter 17, and the diaphragm 16 are disposed in this order toward the base end portion 12A from the side facing a subject, and are disposed on the same optical axis LA. Here, the optical axis LA corresponds to the light path of an incident ray entering from the subject. The focus lens 15 focuses light emitted from the subject and forms an image. The diaphragm 16 adjusts the amount of the incident ray.

Figure 3:
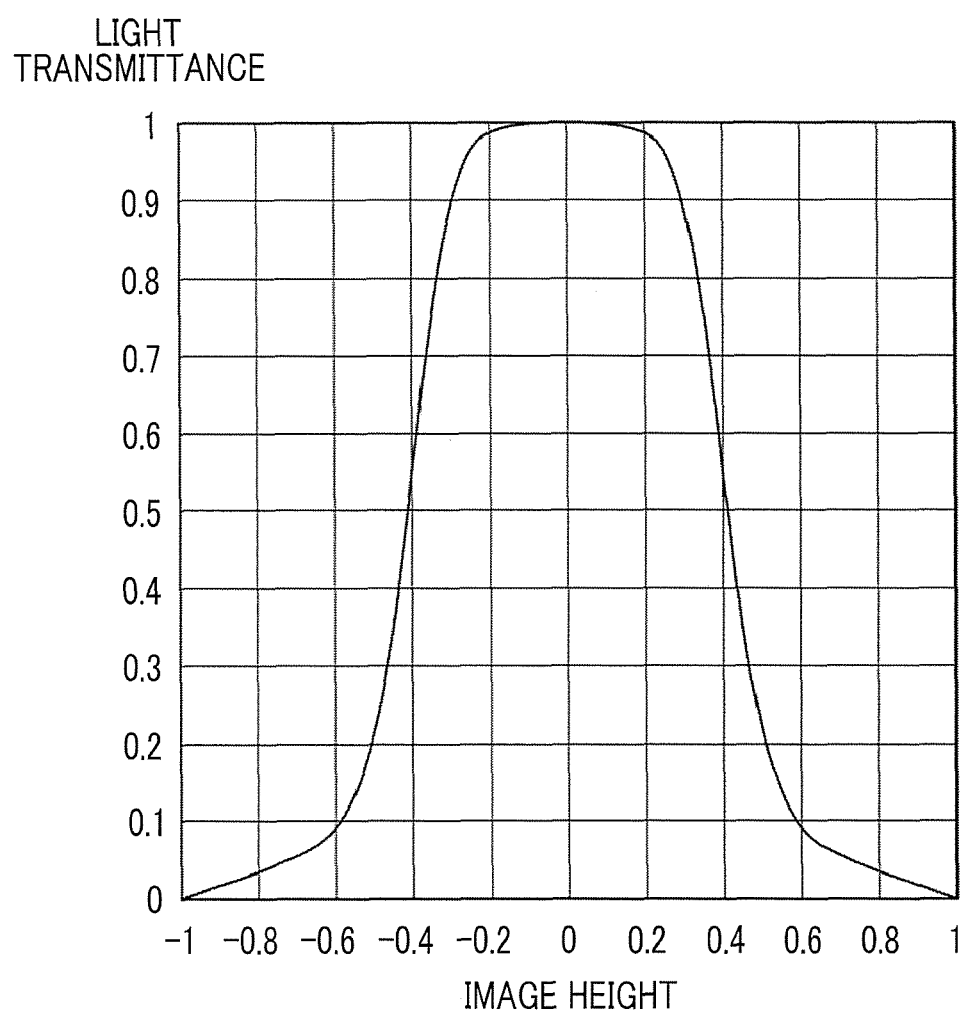
FIG. 3 is a view showing the optical characteristics of an APD filter.

As shown in FIG. 3, the APD filter 17 has optical characteristics in which light transmittance is reduced as a distance from the optical axis LA is increased (as an image height is increased). The APD filter 17 further reduces an incident ray as an image height is increased. For this reason, as the diaphragm value (F number) of the diaphragm 16 approaches an open value, a light-reducing effect of the APD filter 17 is increased. The F number is a value that depends on the effective diaphragm diameter of the diaphragm 16, and light transmittance in an effective diaphragm region is not considered for the F number. The T number is a substantial diaphragm value that is obtained in consideration of light transmittance P in the effective diaphragm region, and is generally expressed by Equation (1).

$$T=F/P^{1/2} \quad (1)$$

In the event that the light transmittance of the APD filter 17 is applied as the light transmittance P, a T number, which is to be obtained in consideration of the optical characteristics of the APD filter 17, is obtained. A relationship between the T number and the F number is represented by a curve (correction curve) shown in FIG. 4. The F number is corrected to the T number by using the correction curve. As the T number approaches the open value, the amount of correction is increased and a variation from the F number is increased.

The lens barrel 12 includes an ID (identification) information storage unit 18. The ID information storage unit 18 stores ID information that is used to specify the type of the lens barrel 12. The type of the APD filter 17 is also specified by the ID information. The ID information, which is stored in the ID information storage unit 18, is sent to the imaging device body 11 through the electrical contacts 11B and 12B.

The imaging device body 11 includes an imaging element 22, an image processing unit 23, an ID information receiving unit 24, an exposure control section 25, a program diagram storage unit 31, a display unit 33, and a memory 34. The imaging element 22 photoelectrically converts an incident ray entering from the lens barrel 12, and outputs imaging signals to the image processing unit 23. The imaging element 22 is a CMOS (Complementary Metal Oxide Semiconductor) image sensor, and can control an electronic shutter speed.

The image processing unit 23 creates a photographed image from the imaging signals, and outputs the photographed image to the display unit 33 and the memory 34. Further, the image processing unit 23 supplies brightness signals, which are obtained from the imaging signals by Y/C conversion or the like, to the exposure control section 25. The display unit 33 displays the photographed image that is input from the image processing unit 23. The memory 34 stores the photographed image that is input from the image processing unit 23.

The ID information receiving unit 24 receives the ID information that is sent from the ID information storage unit 18. The ID information receiving unit 24 specifies the type of the lens barrel 12, which is connected to the imaging device body 11, on the basis of the received ID information. Particularly, the ID information receiving unit 24 determines whether or not the APD filter 17 is included in the lens barrel 12 from the ID information, and supplies the result of determination to the exposure control section 25. The attachment/detachment of the lens barrel 12 substantially corresponds to whether or not the APD filter 17 is disposed on the light path. The ID information receiving unit 24 functions as a filter detecting unit that detects whether or not the APD filter 17 is disposed on the light path.

The exposure control section 25 receives the brightness signals supplied from the image processing unit 23. Further, the exposure control section 25 receives information (filter presence/absence information) that relates to whether or not the APD filter 17 is disposed on the light path and is supplied from the ID information receiving unit 24. Furthermore, the exposure control section 25 receives information (operation mode information) that relates to a currently set operation mode and is supplied from the mode switching button 10B.

The exposure control section 25 includes a photometric unit 27, an imaging exposure determining unit 28, and an imaging exposure setting unit 29. The photometric unit 27 performs the calculation of a photometric value (photometry) on the basis of the brightness signals that are supplied to the exposure control section 25. The photometric unit 27 supplies the calculated photometric value to the imaging exposure determining unit 28. The imaging exposure determining unit 28 obtains an appropriate exposure value (EV) by performing predetermined calculation on the basis of the photometric value that is supplied from the photometric unit 27.

The imaging exposure determining unit 28 acquires the filter presence/absence information and the operation mode information that are supplied to the exposure control section 25. The imaging exposure determining unit 28 selects one program diagram, which is used for the determination of an imaging exposure, from the program diagram storage unit 31 on the basis of the filter presence/absence information and the operation mode information.

The imaging exposure determining unit 28 determines a set of an imaging diaphragm value and an imaging shutter speed on the basis of the EV, which is obtained by the calculation, by using the selected program diagram. The imaging exposure determining unit 28 supplies the determined imaging diaphragm value and the determined imaging shutter speed to the imaging exposure setting unit 29.

The imaging exposure setting unit 29 sets an imaging exposure by setting the imaging diaphragm value and the imaging shutter speed, which are determined by the imaging exposure determining unit 28, in the diaphragm 16 and the imaging element 22.

Figure 6:
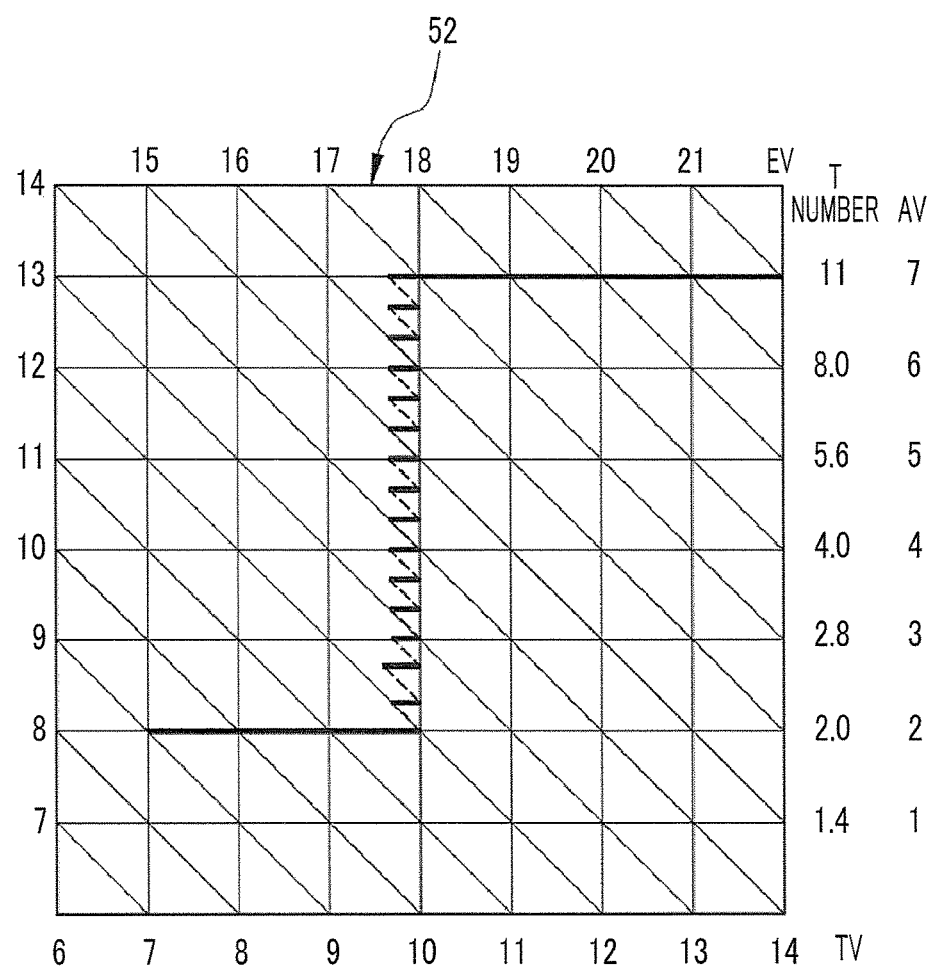
FIG. 6 is a view showing a second program diagram of the first embodiment.
Figure 7:
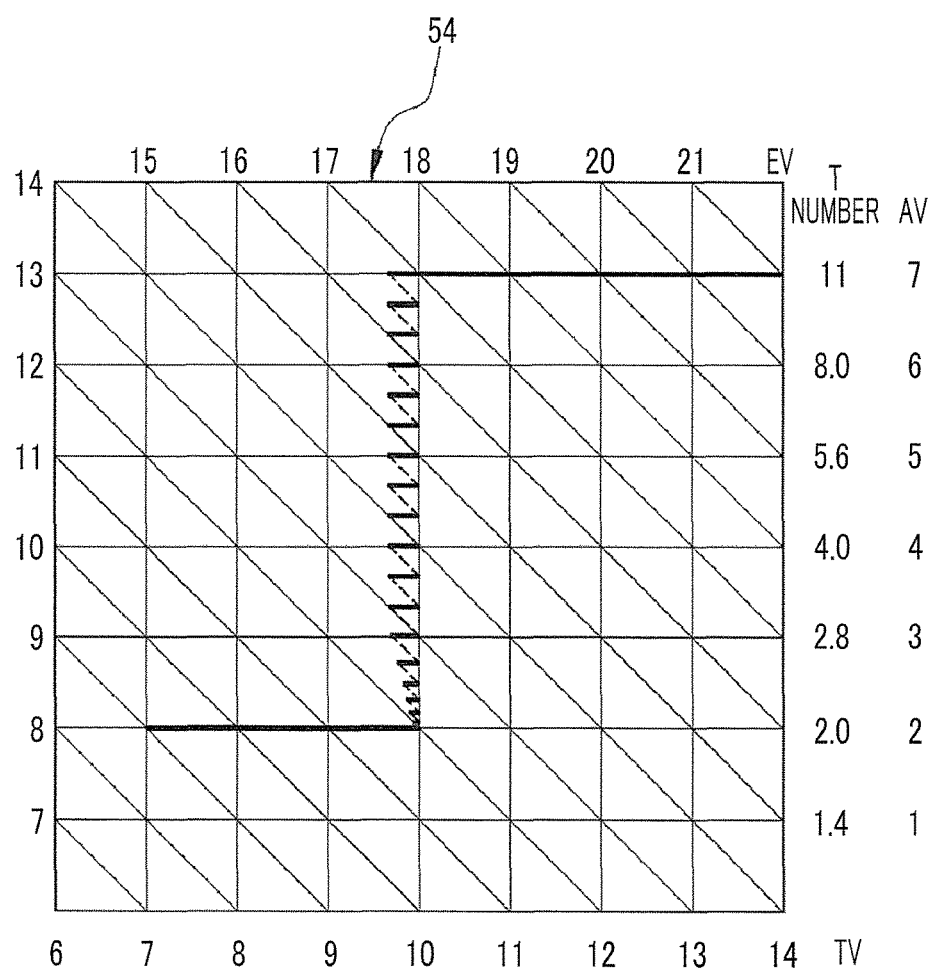
FIG. 7 is a view showing a third program diagram of the first embodiment.

The program diagram storage unit 31 stores a first program diagram 50 (see FIG. 5), a second program diagram 52 (see FIG. 6), and a third program diagram 54 (see FIG. 7). Each of the program diagrams 50, 52, and 54 is expressed by AV (Aperture Value) and TV (Time Value) that satisfy an APEX (Additive system of Photographic EXposure) calculation equation (2).

$$EV=AV+TV \quad (2)$$

Here, AV corresponds to the imaging diaphragm value, and satisfies the relationship of Equation (3) together with the T number. Further, TV corresponds to the imaging shutter speed, and satisfies the relationship of Equation (4) together with the imaging shutter speed t (unit; sec.).

$$AV=2\times\log_2(T) \quad (3)$$

$$TV=-\log_2(t) \quad (4)$$

The first program diagram 50 is used in a case in which a lens barrel (not shown) not including the APD filter 17 is connected to the imaging device body 11. Since "T=F" is satisfied in a case in which the APD filter 17 is not present, a vertical axis of the first program diagram 50 represents an F number and AV corresponding to the F number.

The second program diagram 52 is used in a case in which the lens barrel 12 including the APD filter 17 is connected to the imaging device body 11 and an operation mode is the live view mode or the video imaging mode. Since "T≠F" is satisfied in a case in which the APD filter 17 is present, a vertical axis of the second program diagram 52 represents a T number, which is a substantial diaphragm value, and AV corresponding to the T number.

The third program diagram 54 is used in a case in which the lens barrel 12 including the APD filter 17 is connected to the imaging device body 11 and an operation mode is the still image taking mode. A vertical axis of the third program diagram 54 represents a T number and AV corresponding to the T number, as in the second program diagram 52.

Each of the program diagrams 50, 52, and 54 is a multiple-stage diaphragm type, and AVs take discrete values. In each of the program diagrams 50, 52, and 54, a set of AV and TV corresponds to one EV.

The reason why a multiple-stage diaphragm type program diagram is used is to prevent the imaging diaphragm value (AV), which is determined on the basis of a program diagram, from frequently changing in accordance with a change in the exposure value EV that is obtained from the photometric value. Simply, the diaphragm may be fixed so that an imaging diaphragm value is not changed, but the range of the EV cannot be sufficiently covered by only the control of the imaging shutter speed (TV). The reason for this is that TV should be increased in the event that EV is increased while the diaphragm is fixed, but a problem, such as flicker, is likely to be generated in a live view mode or a video imaging mode due to imaging environment in the event that TV is too large. Accordingly, it is necessary to change TV and AV so that the range of EV is covered, but a multiple-stage diaphragm type program diagram in which AV is discretized is used so that AV is not frequently changed as much as possible.

An interval of AVs is constant in the first program diagram 50. In the third program diagram 54, a corrected diaphragm value (T number), which is obtained by correcting the diaphragm value (F number) of the first program diagram 50 on the basis of the optical characteristics of the APD filter 17, is used and an interval of AVs is not constant and is reduced with a reduction in AV. A part of AVs of the third program diagram 54 are thinned out in the second program diagram 52 so that each interval has at least a predetermined value.

Figure 4:
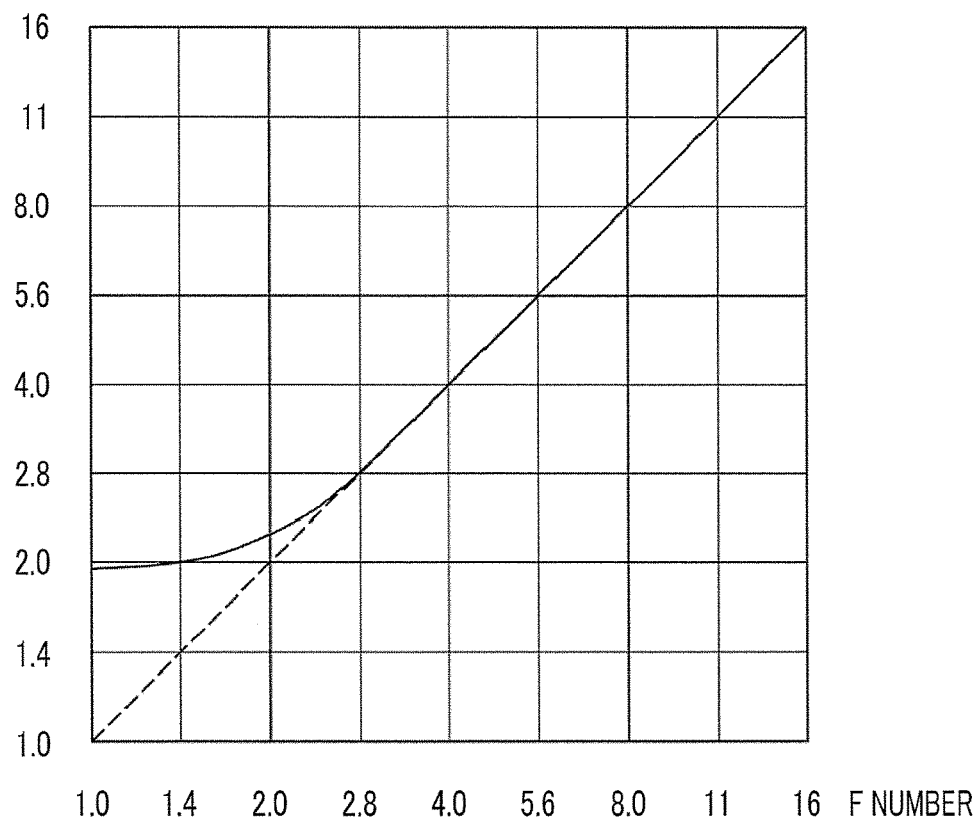
FIG. 4 is a view showing the correction of a diaphragm value based on the optical characteristics of the APD filter.
Figure 8:
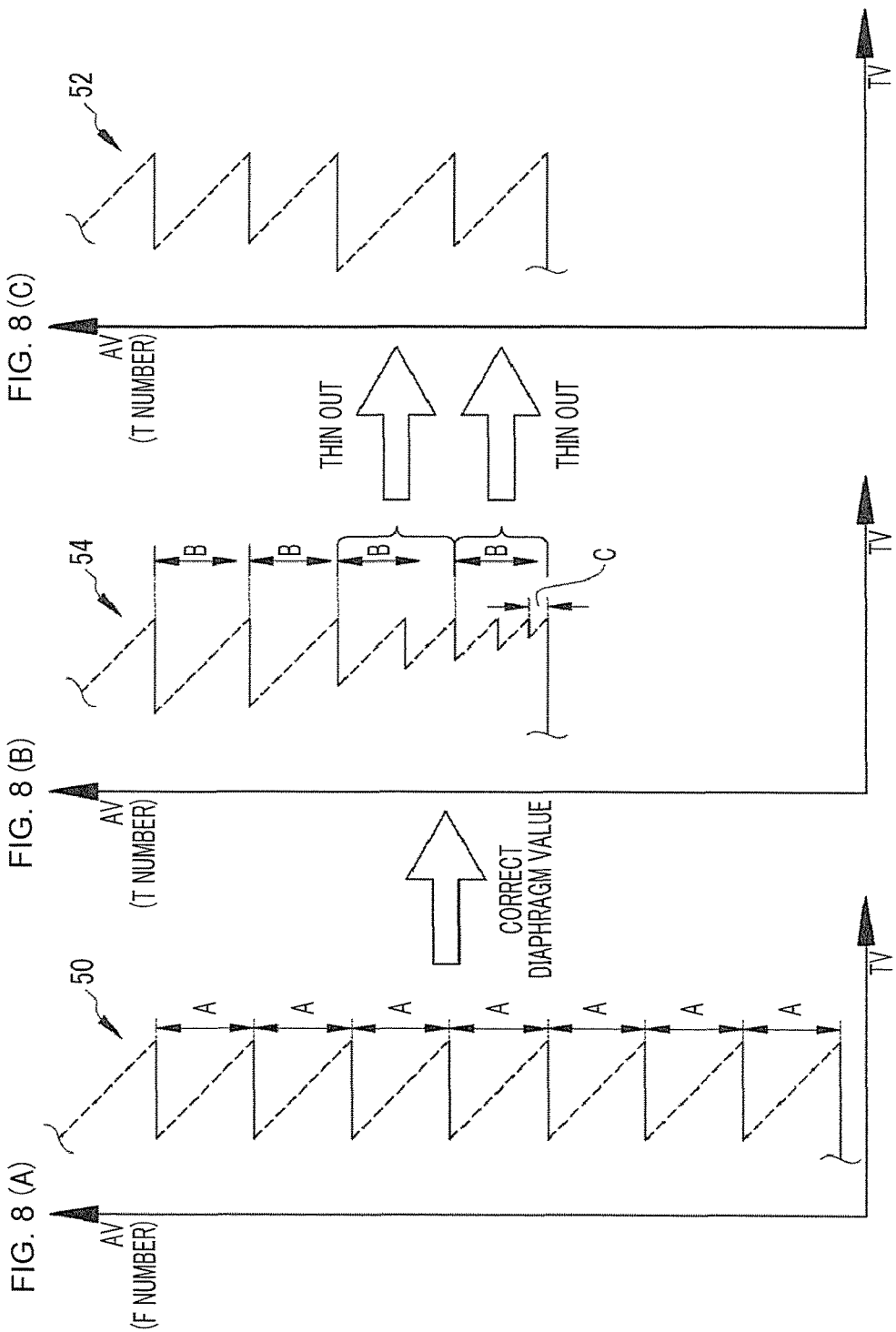
FIGS. 8(A) to 8(C) are views showing a relationship between the first to third program diagrams.

FIGS. 8(A) to 8(C) show a relationship between the respective program diagrams 50, 52, and 54. As shown in FIG. 8(A), the interval of AVs of the first program diagram 50 is constant and is denoted by "A" (first value). As shown in FIG. 8(B), the interval of AVs is equal to or smaller than "A" since the diaphragm value (T number) shown in FIG. 4 is used in the third program diagram 54. The minimum interval of AVs of the third program diagram 54 is denoted by "C". As shown in FIG. 8(C), AVs of the third program diagram 54 are thinned out in the second program diagram 52 so that each interval is equal to larger than at least "B" (second value), and each interval is equal to or larger than B and is smaller than A. Here, B satisfies a relationship of "C<B<A".

Since a diaphragm value is corrected to a T number from an F number in FIG. 8(B), an interval of AVs of a multiple-stage portion is reduced and a plurality of sets of AVs and TVs correspond to one EV. Accordingly, the length of the program diagram in a TV direction is adjusted (reduced) so that one set of AV and TV corresponds to one EV. Further, since AVs are thinned out in FIG. 8(C), there are EVs that do not correspond to any combination of AV and TV. Accordingly, the length of the program diagram in the TV direction is adjusted (increased) so that one set of AV and TV corresponds to one EV. The adjustment of the length of the program diagram at the multiple-stage portion is performed by the adjustment of the position of a small end of the program diagram in the TV direction in this embodiment, but may be performed by the adjustment of the position of a large end of the program diagram in the TV direction.

Figure 9:
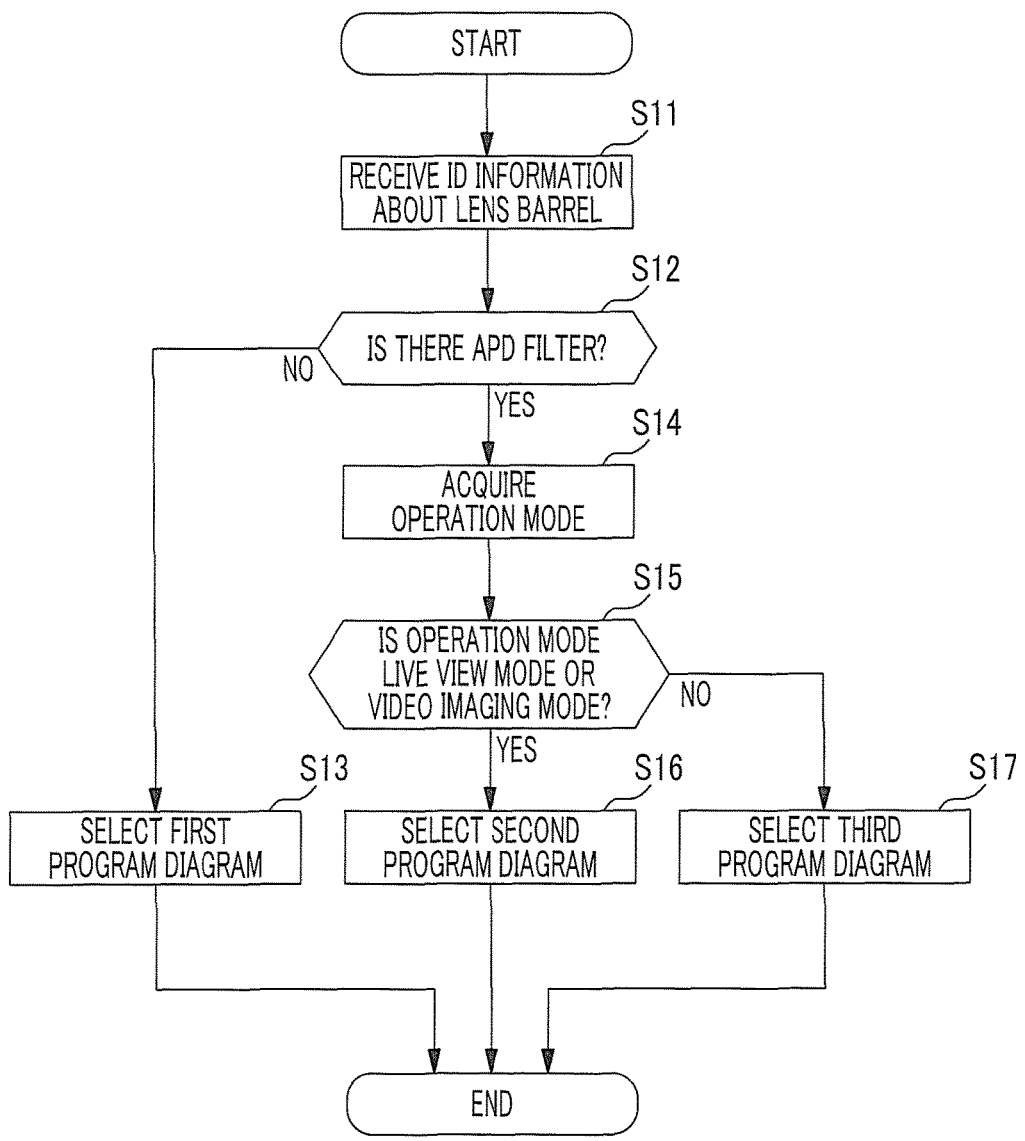
FIG. 9 is a flow chart for selecting a program diagram.

The selection of a program diagram, which is used for the determination of an imaging exposure, will be described with reference to a flow chart shown in FIG. 9. The ID information receiving unit 24 receives ID information that is sent from the ID information storage unit 18 (Step S11), and determines whether or not the APD filter 17 is included in the lens barrel 12 from the received ID information (Step S12).

In a case in which it is determined that the APD filter 17 is not included in the lens barrel 12 (the determination of NO in Step S12), the ID information receiving unit 24 supplies filter presence/absence information that the APD filter 17 is not included in the lens barrel 12 to the imaging exposure determining unit 28. The imaging exposure determining unit 28 selects the first program diagram 50 from the program diagram storage unit 31 as a program diagram, which is used for the determination of an imaging exposure, on the basis of the filter presence/absence information (Step S13).

In a case in which it is determined that the APD filter 17 is included in the lens barrel 12 (the determination of YES in Step S12), the ID information receiving unit 24 supplies filter presence/absence information that the APD filter 17 is included in the lens barrel 12 to the imaging exposure determining unit 28.

The imaging exposure determining unit 28 acquires operation mode information (Step S14), and determines the current operation mode (Step S15). In a case in which an operation mode is the live view mode or the video imaging mode (the determination of YES in Step S15), the imaging exposure determining unit 28 selects the second program diagram 52 from the program diagram storage unit 31 as a program diagram that is used for the determination of an imaging exposure (Step S16).

In a case in which it is determined that an operation mode is the still image taking mode and is not the live view mode or the video imaging mode (the determination of NO in Step S15), the imaging exposure determining unit 28 selects the third program diagram 54 from the program diagram storage unit 31 as a program diagram that is used for the determination of an imaging exposure (Step S17). In the event that the shutter button 100 is pressed during the live view mode and an operation mode is switched to the still image taking mode, the selected program diagram is switched to the third program diagram 54 from the second program diagram 52.

Next, an action of the imaging device 10 in a case in which the imaging device 10 of which the lens barrel 12 including the APD filter 17 is mounted on the imaging device body 11 is in the live view mode or the video imaging mode will be described with reference to a flow chart shown in FIG. 10. In this case, the second program diagram 52 is selected as a program diagram that is used for the determination of an imaging exposure as described above.

The image processing unit 23 acquires brightness signals by performing processing, such as Y/C conversion, on the imaging signals that are input from the imaging element 22 (Step S21), and supplies the brightness signals to the exposure control section 25. The photometric unit 27 calculates a photometric value on the basis of the supplied brightness signals (Step S22), and supplies the calculated photometric value to the imaging exposure determining unit 28.

The imaging exposure determining unit 28 calculates appropriate EV by performing predetermined calculation on the basis of the photometric value that is supplied from the photometric unit 27 (Step S23). The imaging exposure determining unit 28 determines AV and TV, which correspond to the calculated EV, by using the selected second program diagram 52. That is, the imaging exposure determining unit 28 determines an imaging exposure (Step S24). The imaging exposure determining unit 28 supplies the determined AV and the determined TV to the imaging exposure setting unit 29.

The imaging exposure setting unit 29 sets the diaphragm 16 and sets the shutter speed of the imaging element 22 on the basis of the AV and the TV that are supplied from the imaging exposure determining unit 28 (Step S25).

An imaging operation is performed by the imaging element 22 under the setting of an imaging exposure, which is performed by the imaging exposure setting unit 29, and imaging signals are output. A photographed image is created from the imaging signals by the image processing unit 23. This photographed image is displayed in the display unit 33 and is stored in the memory 34 (Step S26). Although not shown in FIG. 10, an evaluated value used to perform a focusing operation is simultaneously calculated in the event that the photographed image is formed from the imaging signals by the image processing unit 23 in a case in which the focusing operation is performed. A focus position is calculated using the evaluated value while the focus lens 15 is driven, and the focusing operation is performed.

The above-mentioned Steps S21 to S27 are repeated in a case in which an operation mode is not changed from the live view mode or the video imaging mode (the determination of NO in Step S27). The operation ends in a case in which an operation mode is switched to the still image taking mode or the image playback mode (the determination of YES in Step S27).

In the case of the still image taking mode, the same steps S21 to S26 as the above-mentioned steps are performed only one time by using the selected third program diagram 54. As a result, a still image is acquired.

Figure 11:
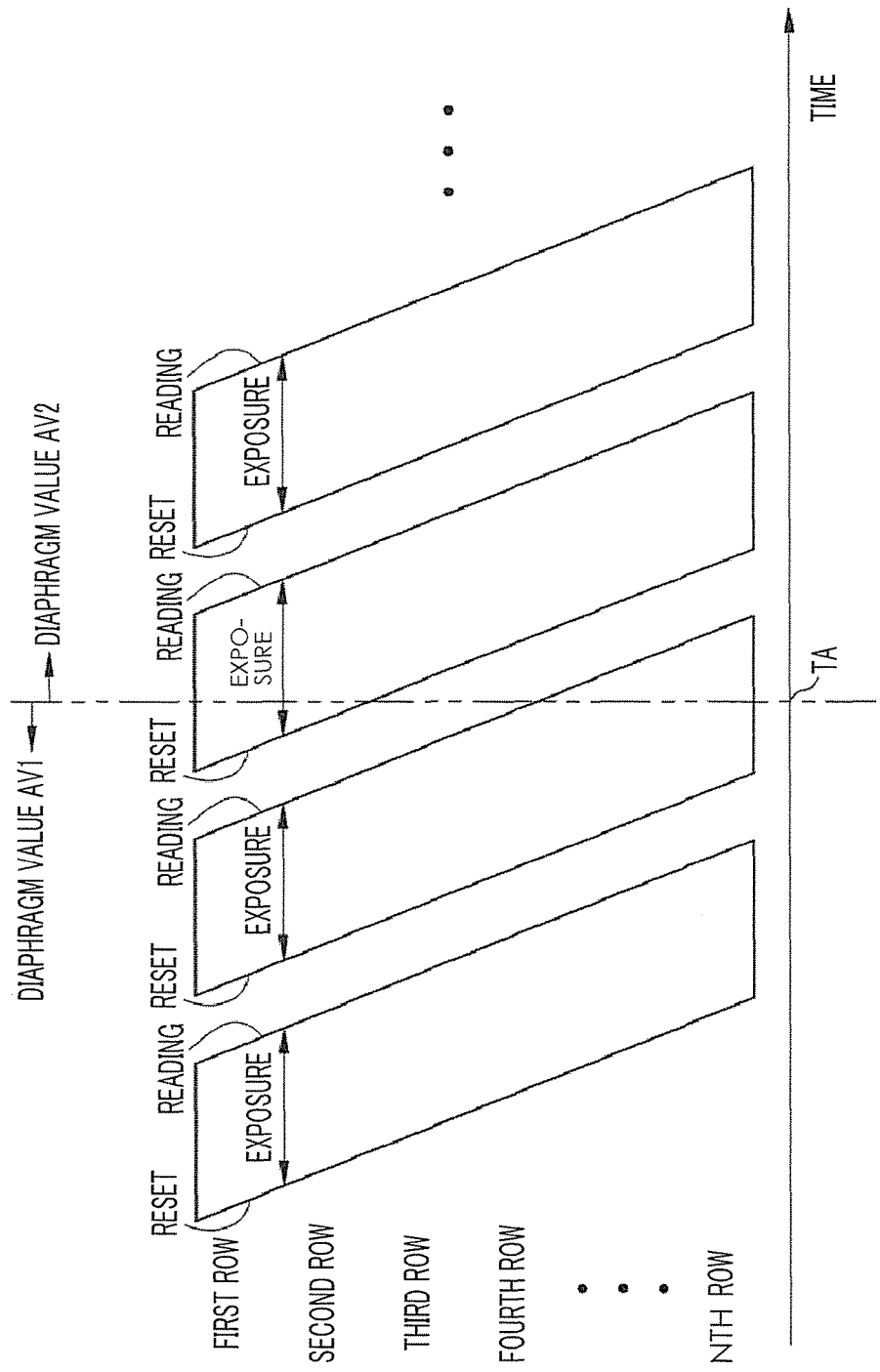
FIG. 11 is a view showing a rolling shutter method of a CMOS image sensor.

The imaging element 22 performs an imaging operation by a rolling shutter method in a live view mode or a video imaging mode. That is, the imaging element 22 performs the reset of electric charges, exposure, and the reading of accumulated electric charges on each pixel row as shown in FIG. 11. For this reason, an exposure period varies by pixel row. In the case of the live view mode or the video imaging mode, a reset operation and a reading operation are repeated to the last pixel row from the first pixel row. In the event that a diaphragm value is changed to AV2 from AV1 during the imaging operation, brightness changes in an exposure period in a second frame where the exposure period exceeds TA at the time of a change in a diaphragm value. For this reason, unnatural flicker is generated.

In the event that the third program diagram 54 is used in the live view mode or the video imaging mode where an imaging operation is performed by a rolling shutter method, an interval of AVs is small in a region having small AV and AV frequently changes in accordance with a change in EV. For this reason, unnatural flicker is frequently generated. In this embodiment, the second program diagram 52 in which AVs are thinned out so that each interval is set to a predetermined value or more is used in the live view mode or the video imaging mode. Accordingly, AVs are prevented from frequently changing in accordance with a change in EV. In this embodiment, the third program diagram 54 is used in the still image taking mode. The reason for this is that a diaphragm is not switched during exposure and a change in EV does not occur in the still image taking mode.

In the first embodiment, whether or not the APD filter 17 is disposed on the light path is switched by the selection of the lens barrel that is to be mounted on the imaging device body 11. However, the invention is not limited to this aspect. For example, an APD filter moving unit for freely moving the APD filter 17 may be provided in the lens barrel, and the APD filter 17 may be disposed on or removed from the optical axis LA by the APD filter moving unit. In this case, an APD filter position detector for detecting the position of the APD filter 17 is provided and the disposition/removal of the APD filter 17 (the switching of the presence/absence of the APD filter on the light path) is detected by the APD filter position detector.

Further, in the first embodiment, the lens barrel 12 including the APD filter 17 has been mounted on the imaging device body 11 and the third program diagram 54 has been used for the determination of an imaging exposure in a case in which a still image is taken in the still image taking mode. However, the invention is not limited to this aspect. Instead of this aspect, the second program diagram 52 may be used for the determination of an imaging exposure. Since AV does not frequently change in the case of the still image taking mode, it is preferable that the third program diagram 54 is used so that an imaging exposure is set using more accurate AV.

Further, the lens barrel 12 has included the APD filter 17 having the optical characteristics shown in FIG. 3 in the first embodiment. However, the optical characteristics are illustrative and the lens barrel 12 may include an APD filter having optical characteristics different from the optical characteristics of the APD filter 17. In addition, lens barrels including APD filters having different optical characteristics may be connected to the imaging device body 11. In this case, second and third program diagrams corresponding to the optical characteristics of the respective APD filters are stored in the program diagram storage unit 31 of the imaging device body 11, and may be selected according to the type of the APD filter.

Figure 5:
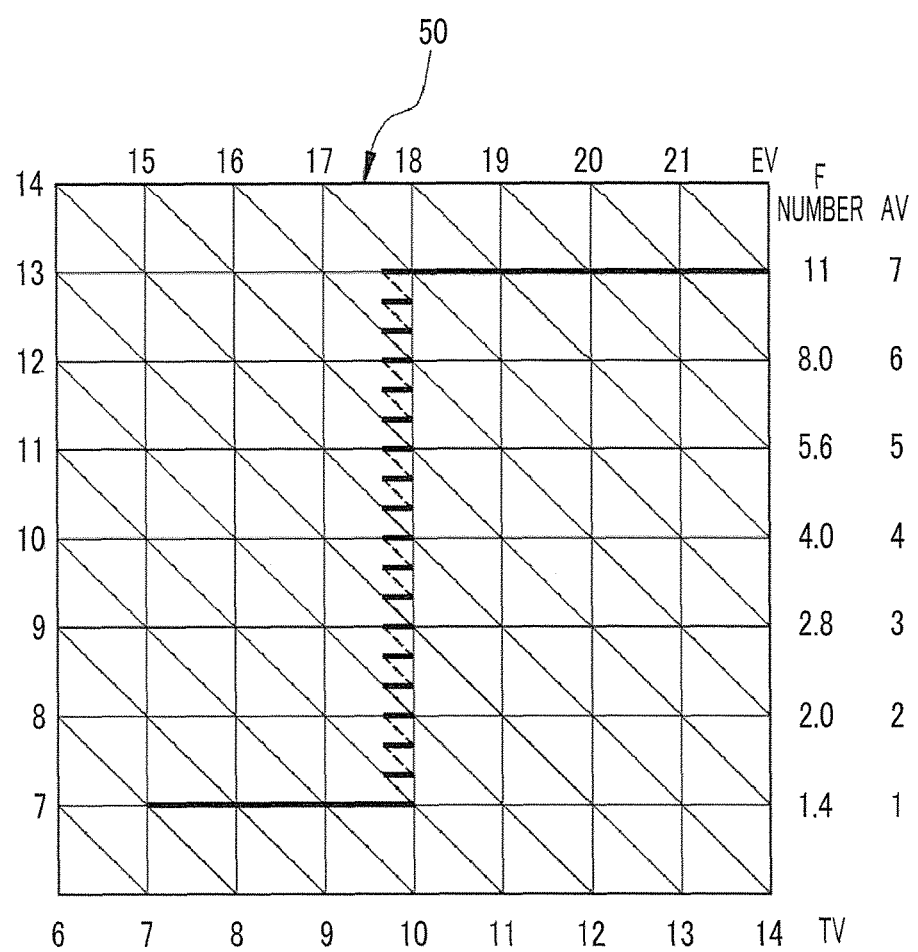
FIG. 5 is a view showing a first program diagram of the first embodiment.

Furthermore, the first program diagram 50 shown in FIG. 5 has been used in the first embodiment. However, the first program diagram may be a multiple-stage diaphragm type program diagram in which an interval of AVs is constant, and may be appropriately changed. The second and third program diagrams may be made in a procedure shown in FIG. 8 on the basis of the first program diagram.

Further, a CMOS image sensor has been used as the imaging element 22 in the first embodiment, but a CCD (Charge Coupled Device) image sensor may be used. In a case in which a CCD image sensor is used, an image is also taken in the live view mode or the video imaging mode by a global shutter method. Even in this case, unnatural flicker is generated in a photographed image in the event that a diaphragm value changes during an exposure period in accordance with a timing of a change in an exposure period or a diaphragm value. Since AVs are prevented from frequently changing in accordance with a change in EV in this embodiment, the occurrence of a change in a diaphragm value during an exposure period is suppressed. As a result, unnatural flicker is suppressed.

Second Embodiment

Figure 12:
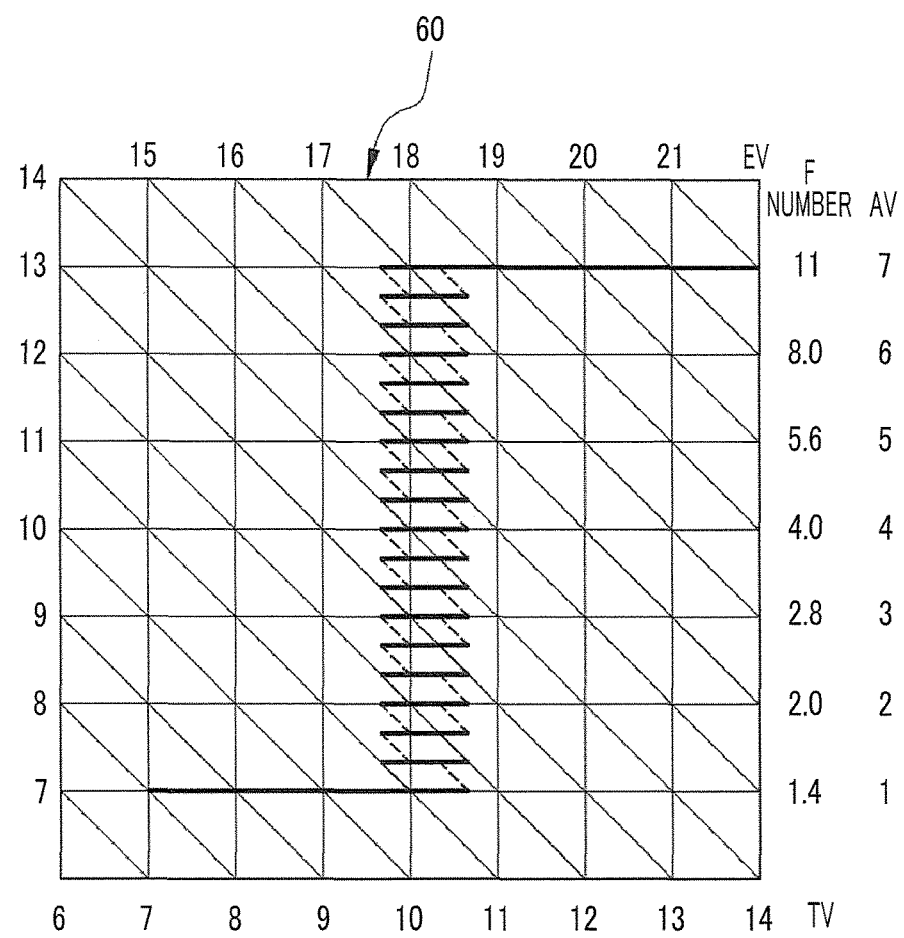
FIG. 12 is a view showing a first program diagram of a second embodiment.
Figure 13:
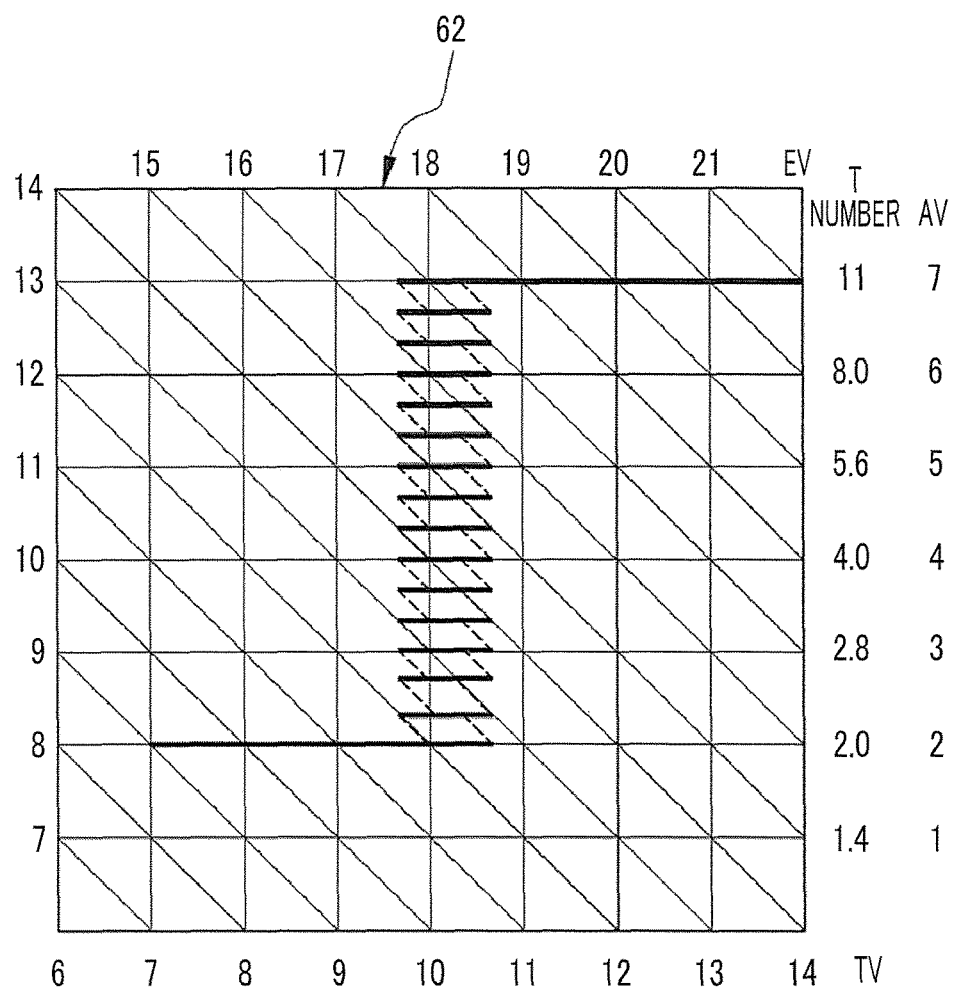
FIG. 13 is a view showing a second program diagram of the second embodiment.
Figure 14:
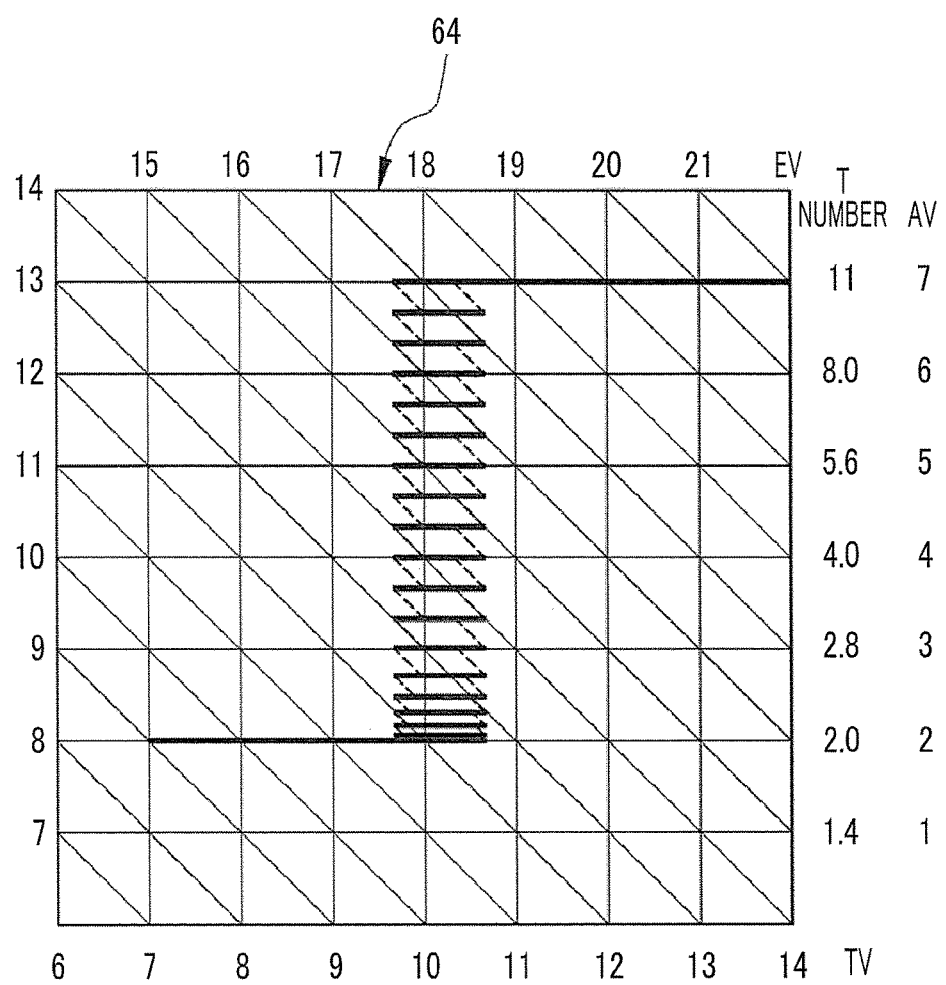
FIG. 14 is a view showing a third program diagram of the second embodiment.

A program diagram in which a set of AV and TV corresponds to one EV has been used as the first program diagram in the first embodiment, but a program diagram including a portion in which a plurality of sets of AVs and TVs correspond to one EV may be used. A first program diagram 60 shown in FIG. 12 is used in a second embodiment. A second program diagram 62 shown in FIG. 13 and a third program diagram 64 shown in FIG. 14 are made in the same procedure as the procedure shown in FIG. 8. Since the second embodiment is the same as the first embodiment except that the first program diagram 60, the second program diagram 62, and the third program diagram 64 are used, the detailed description thereof will be omitted.

Two or more sets of AVs and TVs correspond to one EV in a predetermined region of EV, in which AV is discretized, of each of the first, second, and third program diagrams 60, 62, and 64. It is possible to further suppress a change in AV, which depends on a change in EV, by performing the determination of an imaging exposure as described below using these program diagrams.

Figure 15:
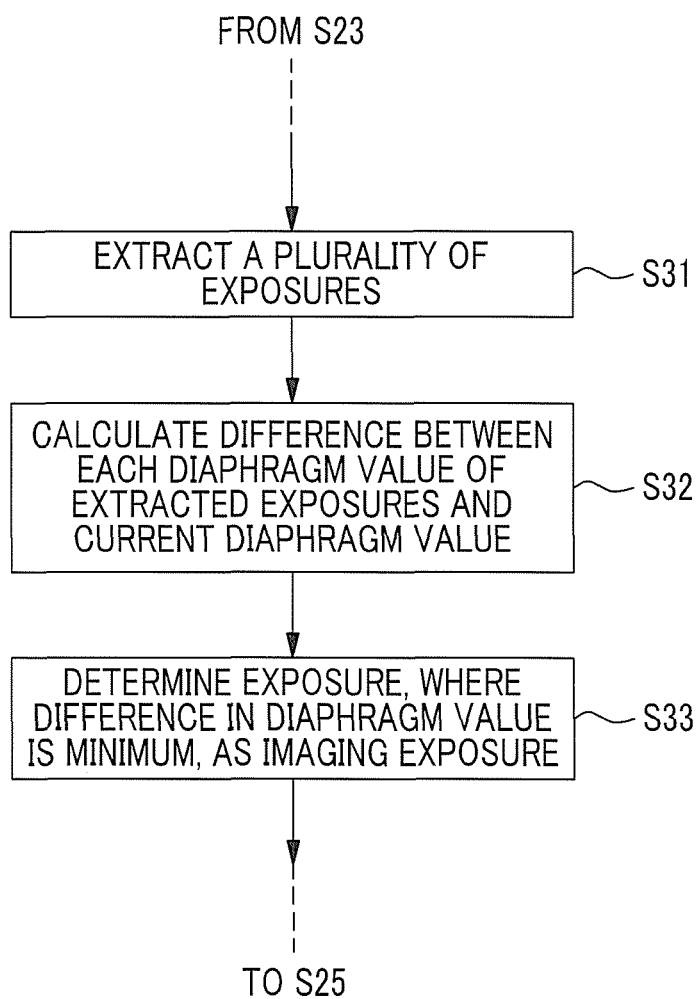
FIG. 15 is a flow chart of the determination of an imaging exposure of the second embodiment.

The determination of an imaging exposure, which is performed using the second program diagram 62, will be described with reference to a flow chart shown in FIG. 15. In the second embodiment, the determination of an imaging exposure is performed by Steps S31 to S33 instead of Step S24 (see FIG. 10) of the first embodiment.

Figure 10:
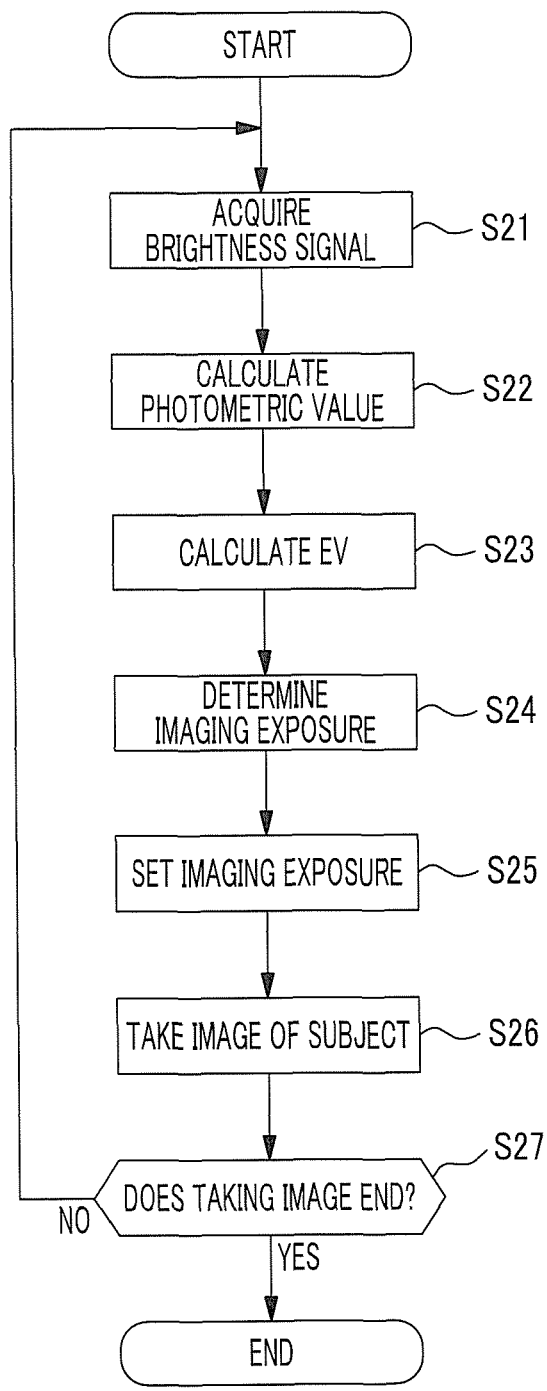
FIG. 10 is a flow chart of video imaging.
Figure 16:
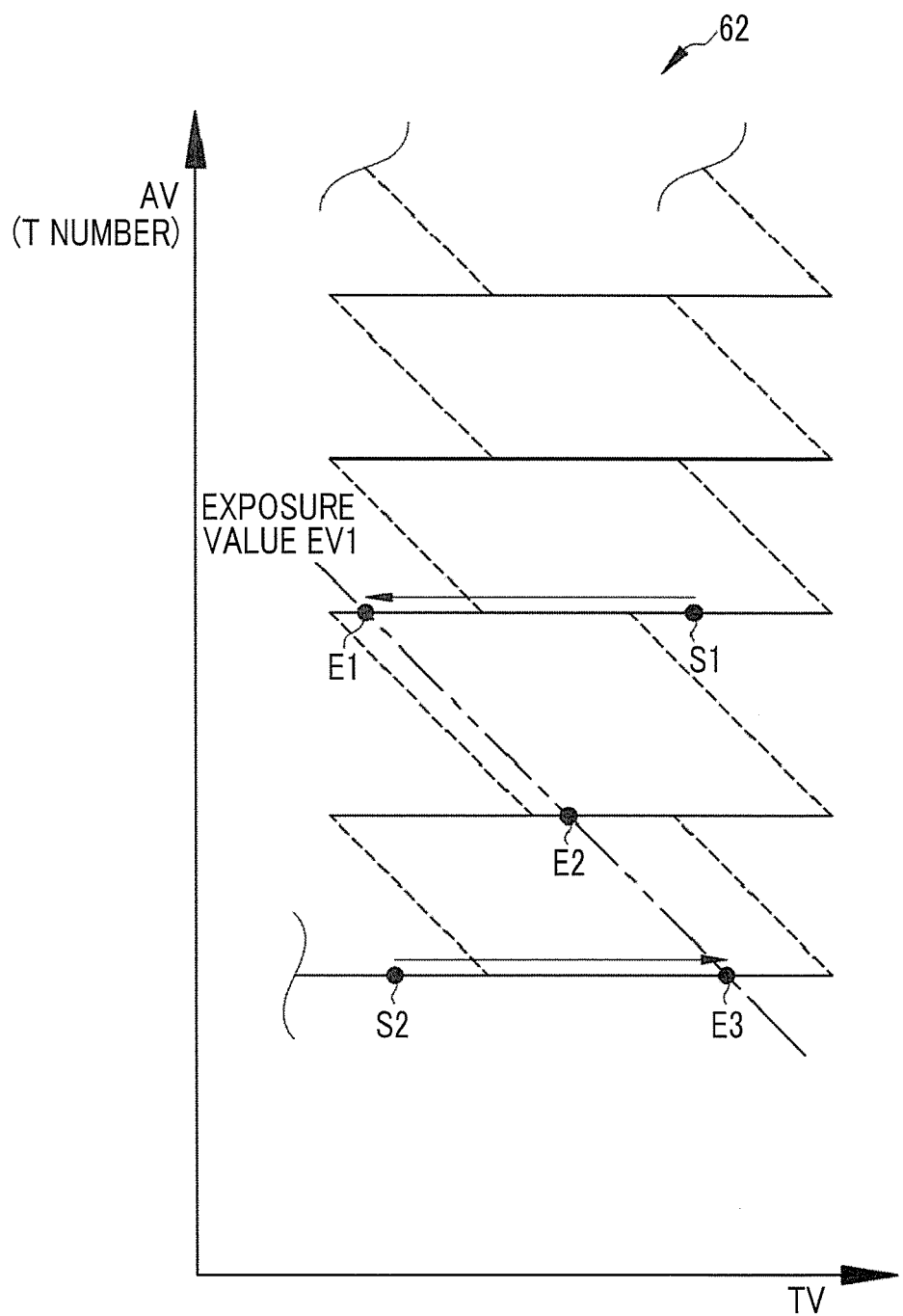
FIG. 16 is a view showing the determination of an imaging exposure of the second embodiment.

After Step S23 shown in FIG. 10, the imaging exposure determining unit 28 extracts a plurality of sets of AVs and TVs, which correspond to calculated EV, by using the selected second program diagram 62 (Step S31). For example, in a case in which the calculation exposure value is EV1, as shown in FIG. 16, three E1, E2, and E3 are present on the second program diagram 62 as a set of AV and TV (exposure) where an exposure value is EV1.

The imaging exposure determining unit 28 calculates a difference between each AV of the plurality of extracted exposures and AV of the current imaging exposure (a difference in AV) (Step S32). Then, the imaging exposure determining unit 28 determines an exposure, where a difference in AV is minimum, among the plurality of extracted exposures, as an imaging exposure (Step S33). That is, an exposure where a variation in an imaging diaphragm value is minimum is selected. For example, the imaging exposure determining unit 28 determines an exposure E1, where a difference in AV is zero, as an imaging exposure in a case in which the current exposure is S1 as shown in FIG. 16. Further, the imaging exposure determining unit 28 determines an exposure E3 as an imaging exposure in a case in which the current exposure is S2. Since a difference in AV is zero in all cases, AV does not change. After that, the respective steps, which are to be performed after Step S25 shown in FIG. 10, are performed.

As described above, in the second embodiment, so-called hysteresis control for determining an exposure, which varies according to the current imaging exposure, as an imaging exposure is performed and an exposure where a variation in AV is small is selected as an imaging exposure on the basis of the current imaging exposure. Accordingly, a change in AV is further suppressed in comparison with the first embodiment.

Third Embodiment

Figure 17:
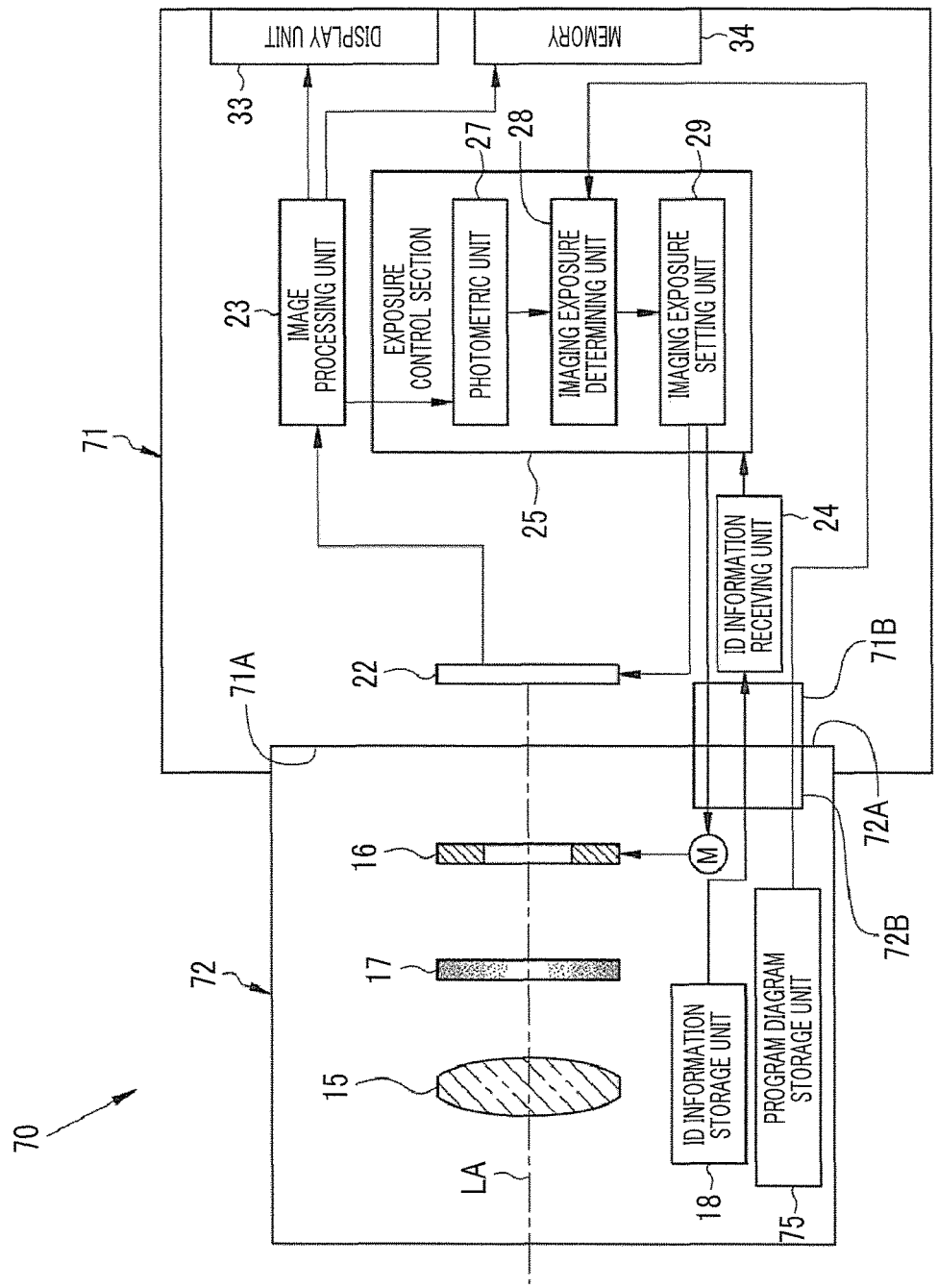
FIG. 17 is a block diagram showing the configuration of an imaging device of a third embodiment.

The program diagram storage unit 31, which stores the program diagrams, is provided in the imaging device body 11 in the first embodiment, but the program diagram storage unit may be provided in the lens barrel. In FIG. 17, an imaging device 70 of a third embodiment includes an imaging device body 71 and a lens barrel 72 and a program diagram storage unit 75 is provided in the lens barrel 72.

A lens barrel mounting portion 71A and a base end portion 72A are provided with electrical contacts 71B and 72B, respectively. The imaging device body 71 and the lens barrel 72 are electrically connected to each other through the electrical contacts 71B and 72B.

The imaging device body 71 is obtained by the removal of the program diagram storage unit 31 from the imaging device body 11 of the first embodiment. Since other configuration of the third embodiment is the same as that of the first embodiment, the detailed description thereof will be omitted.

Program diagrams, which are used in the event that the lens barrel 72 is used, are stored in the program diagram storage unit 75. That is, a second program diagram 52 and a third program diagram 54, which are obtained in consideration of the optical characteristics of the APD filter 17, are stored in the program diagram storage unit 75.

The imaging exposure determining unit 28 has access to the program diagram storage unit 75 on the basis of operation mode information, and selects a program diagram that is used for the determination of an imaging exposure. The imaging exposure determining unit 28 selects the second program diagram 52 in a case in which an operation mode is the live view mode or the video imaging mode. The imaging exposure determining unit 28 selects the third program diagram 54 in a case in which an operation mode is the still image taking mode.

In the third embodiment, the imaging device body 71 acquires a program diagram, which corresponds to the optical characteristics of the APD filter 17 built in the lens barrel 72, from the lens barrel 72. Accordingly, since program diagrams corresponding to the optical characteristics of a plurality of APD filters do not need to be stored in the imaging device body, the configuration of the imaging device body is simplified.

Examples of the lens barrel-interchangeable imaging device have been described in the embodiments, but the invention can also be applied to not a lens-interchangeable imaging device but an integrated imaging device, a mobile phone with a camera, and a smartphone.

EXPLANATION OF REFERENCES 10, 70: imaging device
11, 71: imaging device body
11A, 71A: lens barrel mounting portion
12, 72: lens barrel
12A, 72A: body mounting portion
16: diaphragm
17: APD filter
22: imaging element
25: exposure control section
27: photometric unit
28: imaging exposure determining unit
29: imaging exposure setting unit
31, 75: program diagram storage unit
50, 60: first program diagram
52, 62: second program diagram
54, 64: third program diagram

What is claimed is:

1. An imaging device comprising:
an image sensor that photoelectrically converts an incident ray and outputs an imaging signal;
a diaphragm that adjusts the amount of the incident ray;
an apodization filter that is disposed on a light path of the incident ray;
a program diagram memory that stores a first program diagram in which diaphragm values take discrete values at an interval of a first value and a second program diagram in which a part of corrected diaphragm values, which are obtained by correcting the diaphragm values of the first program diagram on the basis of optical characteristics of the apodization filter, are thinned out so that each interval has at least a second value;
an exposure controller that performs photometry on the basis of the imaging signal, selects the first program diagram in a case in which the apodization filter is not disposed, selects the second program diagram in a case in which the apodization filter is disposed, determines a set of an imaging diaphragm value and an imaging shutter speed on the basis of an exposure value, and sets an imaging exposure on the basis of the imaging diaphragm value and the imaging shutter speed.

2. The imaging device according to claim 1,
wherein "C<B<A" is satisfied in a case in which the first value is denoted by A, the second value is denoted by B, and a minimum interval taken by the corrected diaphragm value based on the optical characteristics is denoted by C.

3. The imaging device according to claim 2,
wherein each interval of diaphragm values of the second program diagram is equal to or larger than the second value and is smaller than the first value.

4. The imaging device according to claim 3,
wherein the set of the imaging diaphragm value and an imaging shutter speed corresponds to one exposure value in the second program diagram.

5. The imaging device according to claim 3,
wherein the second program diagram includes a portion in which a plurality of sets of imaging diaphragm values and imaging shutter speeds correspond to one exposure value, and
the exposure controller selects the set of the imaging diaphragm value and the imaging shutter speed where a variation in an imaging diaphragm value is minimum, in a case in which the exposure controller is to determine the set of the imaging diaphragm value and the imaging shutter speed due to a change in the exposure value and a plurality of sets of imaging diaphragm values and imaging shutter speeds are present per exposure value.

6. The imaging device according to claim 1,
wherein the program diagram memory stores a third program diagram in which corrected diaphragm values, which are obtained by correcting the diaphragm values of the first program diagram on the basis of optical characteristics, are not thinned out and take discrete values, and
the exposure controller selects the second program diagram in a video imaging mode and a live view mode and selects the third program diagram in a still image taking mode, in a case in which the apodization filter is disposed.

7. The imaging device according to claim 1, further comprising:
a detecting processor that detects whether or not the apodization filter is disposed on the light path,
wherein the exposure controller selects the first program diagram or the second program diagram on the basis of a detection result of the detecting processor.

8. The imaging device according to claim 1,
wherein the image sensor is a rolling shutter CMOS image sensor.

9. An imaging device body comprising:
a lens barrel mounting portion on which a lens barrel including a diaphragm and an apodization filter is detachably mounted;
an image sensor that photoelectrically converts an incident ray entering from the lens barrel and outputs an imaging signal;
a program diagram memory that stores a first program diagram in which diaphragm values take discrete values at an interval of a first value, and a second program diagram in which a part of corrected diaphragm values, which are obtained by correcting the diaphragm values of the first program diagram on the basis of optical characteristics of the apodization filter, are thinned out so that each interval has at least a second value;
an exposure controller that performs photometry on the basis of the imaging signal, selects the first program diagram in a case in which the apodization filter is not disposed, selects the second program diagram in a case in which the apodization filter is disposed, determines a set of an imaging diaphragm value and an imaging shutter speed on the basis of an exposure value obtained from a photometric value, and sets an imaging exposure on the basis of the imaging diaphragm value and the imaging shutter speed.

10. A lens barrel comprising:
a diaphragm that adjusts the amount of an incident ray;
an apodization filter that is disposed on a light path of the incident ray;
a program diagram memory that stores a second program diagram in which a part of corrected diaphragm values, which are obtained by correcting diaphragm values of a first program diagram in which the diaphragm values of the first program diagram take discrete values at an interval of a first value on the basis of optical characteristics of the apodization filter, are thinned out so that each interval has at least a second value; and a base end portion that is detachably mounted on an imaging device body, the imaging device body including an image sensor that photoelectrically converts an incident ray and outputs an imaging signal, an exposure controller that performs photometry on the basis of the imaging signal, receives the second program diagram and determines a set of an imaging diaphragm value and an imaging shutter speed on the basis of an exposure value, and sets an imaging exposure on the basis of the imaging diaphragm value and the imaging shutter speed.

\* \* \* \* \*